Sept. 22, 1942.  C. E. BISER  2,296,593
ANIMAL POKE
Filed Aug. 29, 1941
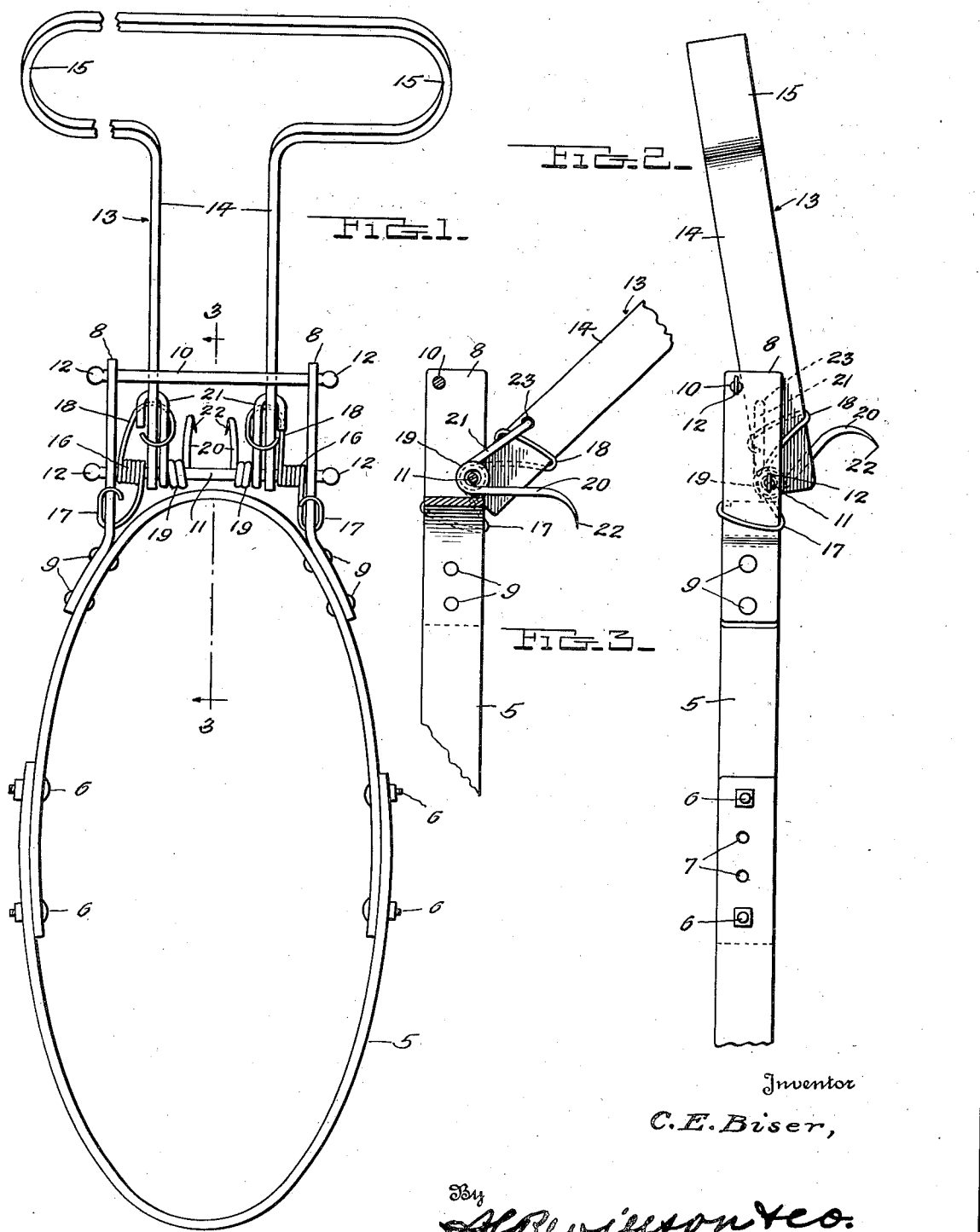
Inventor
C. E. Biser,
By H. B. Wilson & Co.
Attorneys Patented Sept. 22, 1942

2,296,593

UNITED STATES PATENT OFFICE 2,296,593

ANIMAL POKE

Charles E. Biser, Selma, Ala., assignor of forty per cent to T. W. Dansby

Application August 29, 1941, Serial No. 408,863

4 Claims. (Cl. 119—140)

The invention relates to a new and improved poke to keep cattle or other animals from forcing their heads between wires, rails or the like of fences, and the invention aims to provide an exceptionally simple and inexpensive, light weight, easily applied, efficient and comfortable device of this character.

With the foregoing in view, the invention resides in the novel subject matter hereinafter described and claimed, description being accomplished by reference to the accompanying drawing.

Figure 1 is a front elevation.

Figure 2 is a side elevation.

Figure 3 is a fragmentary vertical section on line 3—3 of Fig. 1 showing the spur-operating member swung rearwardly to cause the spur to prod the top of the animal's neck.

A preferred construction will be illustrated and will be specifically described, with the understanding, however, that within the scope of the invention as claimed, minor variations may be made.

A rigid collar 5, preferably of strap metal, is provided, composed of upper and lower sections adjustably connected with each other, preferably by means of bolts 6 which may be passed through any of a plurality of vertically spaced openings 7 in the overlapping ends of the sections. Two laterally spaced rigid arm 8, preferably of strap metal, are secured to and project upwardly from the upper end of the collar 5, the lower ends of said arms being preferably secured by means of rivets 9 to said collar. These arms carry an upper horizontal rod 10 and a lower horizontal rod 11, said rod 10 being disposed toward the front edges of the arms 8 and said lower rod 11 being disposed toward the rear edges of said arms. The ends of the rods pass through openings in the arms and are flattened at 12 or otherwise upset to prevent withdrawal.

An arched spur-operating member 13, preferably of strap metal, is pivotally mounted at its lower end upon the rod 11 by extending this rod through openings in the two vertical legs 14 of said member. These openings are toward the front edges of the legs 14 and these edges normally rest against the rear side of the upper rod 10. By forwardly offsetting this upper rod from the lower rod 11 and by placing the pivot of the member 13 toward its front edge, it is insured, without forwardly bending said member or the arms 8, that said member will incline forwardly when the collar 5 is vertical and said member will thus more readily catch upon a fence to swing rearwardly and operate the prongs hereinafter described. The upper ends of the legs 14 are preferably offset outwardly from the major portions of said legs as indicated at 15, providing shoulders to hook upon a fence if an animal wearing the poke turns its head while attempting to pass through said fence. Associated with the lower ends of these legs 14, are two coiled springs 16 which surround the pivot rod 11, said springs having lower arms 17 hooked around the rigid upstanding arms 8, and upper arms 18 hooked around the legs 14 of the spur-operating member 13, so as to normally hold said member 13 against the rear side of the stop rod 10 as seen in Fig. 2.

Two additional coiled springs 19 surround the pivot rod 11 at the inner sides of the legs 14, said springs 19 having lower arms 20 and upper arms 21, the former extending rearwardly from said springs. The rear ends of the arms 20 are curved downwardly and sharpened to provide prongs 22, and the upper arms 21 are hooked through openings 23 in the legs 14. Thus, although the prongs 22 are normally above the neck of an animal wearing the poke, when the member 13 is swung rearwardly as the animal attempts to force through a fence, the arms 21 will turn the springs 19 on the pivot rod 11 and these springs will force the prongs 22 downwardly to prod the animal's neck. Severe injury, however, is prevented by by yielding of the springs 19.

From the foregoing taken in connection with the accompanying drawing, it will be seen that novel and advantageous provision has been made for carrying out the object of the invention, and while preferred details have been disclosed, attention is directed to the possibility of making changes within the scope of the invention as claimed.

I claim:

1. A poke comprising a collar, a horizontal pivot member over said collar, supporting means projecting upwardly from said collar and supporting said pivot member, an upstanding spur-operating member having its lower end pivotally mounted upon said pivot member, a coil surrounding said pivot member and having an upper arm connected with said spur-operating member, said coil also having a rearwardly projecting arm whose rear end is turned downwardly and sharpened to provide a neck prodding spur, spring means for normally urging said spur-operating member forwardly, and means for limiting the forward movement of said spur-operating member.

2. A poke comprising a rigid collar, two laterally spaced rigid upstanding arms secured to the upper end of said collar, an upper rod extending between the upper front portions of said arms, a lower rod extending between the lower rear portions of said arms, an arched spur-operating member whose legs extend behind said upper rod and are pivotally mounted toward their front edges upon said lower rod, said legs being inwardly spaced from said upstanding arms, coil springs surrounding said lower rod between said upstanding arms and said legs, said coil springs having upper arms connected with said legs and lower arms connected with said upstanding arms to normally swing said spur-operating member forwardly against said upper rod, and additional coils surrounding said lower rod at the inner sides of said legs, said additional coils having upstanding arms connected with said legs, said additional coils also having rearwardly projecting lower arms whose rear ends are turned downwardly and sharpened to provide neck-prodding spurs.

3. A poke comprising a rigid collar, an arched spur-operating member over said collar, said member comprising two spaced legs having their upper ends abruptly offset outwardly from their major portions and a crown bar secured to and extending between the upper extremities of said legs, said abrupt offsets providing shoulders to catch on a fence if the animal turns its head while attempting to pass through the fence, means pivotally mounting said legs on said collar, spring means for normally swinging said member forwardly, means for limiting the forward movement of said member, and rearwardly projecting spur means connected with said member.

4. A poke comprising a rigid collar having two rigid upwardly projecting laterally spaced arms, each of said arms having straight parallel front and rear edges and parallel inner and outer sides, an upper rod extending between and carried by said arms, said upper rod being disposed near said straight front edges of said arms, a lower rod extending between and carried by said arms, said lower rod being located near said straight rear edges of said arms, a spur-operating member having its lower portion received between said arms, said spur-operating member having straight parallel front and rear edges and parallel sides, the latter being in planes parallel with said parallel sides of said arms, the lower end of said spur-operating member having an opening receiving said lower rod and located near said straight front edge of said member, spring means normally holding said member forwardly against the rear side of said upper rod, and rearwardly projecting spur means connected with said member; the above specified locations of said rods and said opening serving to give said member a forward inclination without the necessity of forwardly bending said member or forwardly bending said arms.

CHARLES E. BISER.